Oct. 25, 1966  R. H. MONROE  3,280,634
COMMODITY SAMPLING APPARATUS FOR A CONVEYOR
Filed March 7, 1966                                           2 Sheets-Sheet 1
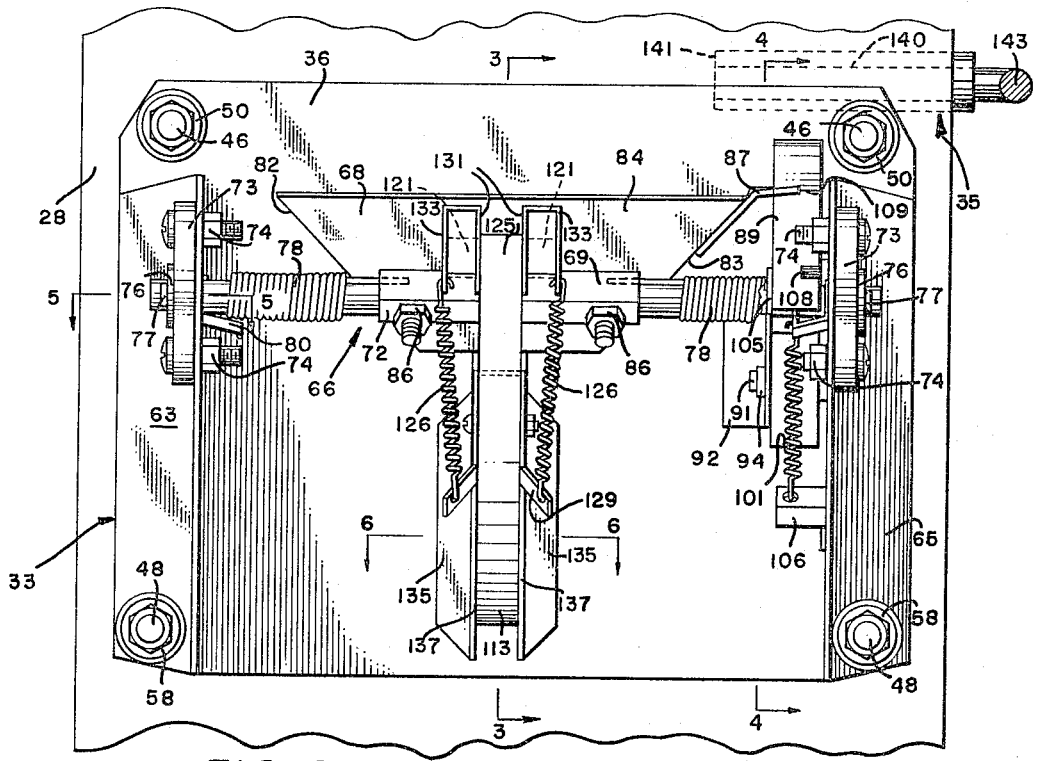
FIG. 2
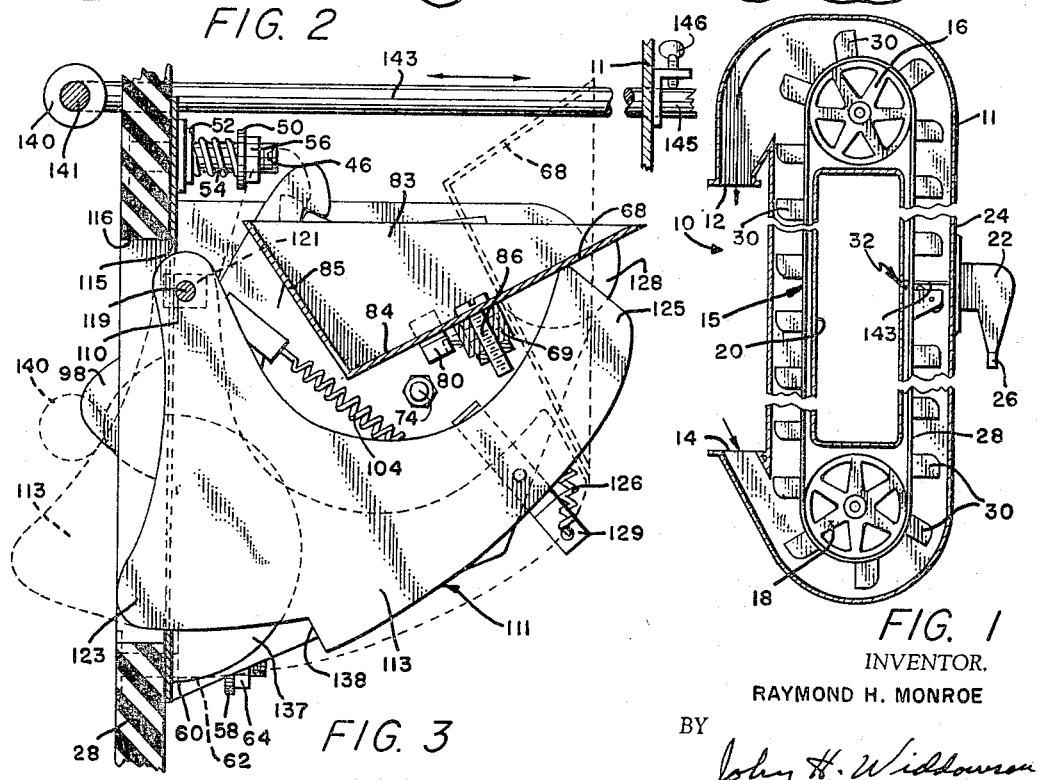
FIG. 3
FIG. 1
INVENTOR.
RAYMOND H. MONROE
BY
John H. Widdowson
ATTORNEY INVENTOR.
RAYMOND H. MONROE
BY
John H. Widdowson
ATTORNEY United States Patent Office 3,280,634
Patented Oct. 25, 1966

1

3,280,634
COMMODITY SAMPLING APPARATUS FOR
A CONVEYOR
Raymond H. Monroe, 4569 S. Handley, Wichita, Kans.
Filed Mar. 7, 1966, Ser. No. 532,398
9 Claims. (Cl. 73—421)

This application is a continuation-in-part of applicant's co-pending application Serial Number 303,623 filed August 21, 1963, now Patent No. 3,248,949.

This invention relates to means for taking samples of grain, flour, or other material and, in a more specific aspect, the invention relates to means for use with a conveyor system whereby a sample of material being moved by the conveyor system can be taken periodically. In a still more specific aspect, the invention relates to an explosion proof sampling apparatus for use with a conveyor system wherein a material receiving portion of the apparatus passes through the boot portion of the conveyor system to receive material therein and is periodically actuated to discharge the conveyed material into a sample container for quality control inspection or other uses.

Various attempts have been made to provide satisfactory sampling apparatus for grain, flour, coal or other materials and includes devices wherein entirely separate conveying apparatus are utilized for the sample taking operations whereas such is undesirable since it is expensive, requires space not normally available in the conveying system for moving the sample commodity in question, and the operator is not assured of receiving an accurate sample of the material then being conveyed. Other sampling means have been provided to trip conveying apparatus, such as buckets or the like mounted on belts, so that the conveyor can be utilized to convey materials between various levels or floors in a building or the like; however, such does not provide suitable means for taking material samples but merely serves as a means for conveying the entire load in the bucket or conveyor system to a specific level or location. It is also desirable to provide sampling means that can be automatically actuated as desired without the danger of electrical sparks or the like which in a coal or grain dust atmosphere are likely to cause an explosion with resultant injury to personnel and equipment.

In accordance with the present invention, new means for sampling materials, particularly conveyor moved materials or the like, has been provided which overcome many of the above mentioned disadvantages of the prior art devices. The apparatus for sampling materials of this invention includes support means, means for receiving conveyor moved material movably mounted on the support means, and means operatively connected to the means to receive material to move same relative to the support means for discharge of material therein. Actuating means are associated with the means operatively connected to the means to receive material to cause movement of the means to receive material so that a sample of the material contained therein can be taken.

Accordingly, it is an object of the invention to provide new means for sampling materials, particularly conveyor moved material.

Another object of the invention is to provide means for sampling materials or the like which is connectable to conveyor structures and movable therewith without substantial modification of the conventional conveyor structure.

A further object of the invention is to provide new sampler means for conveyor moved materials or the like in which a sample of the material is taken during each complete cycle of operation of the associated conveyor means.

Still another object of the invention is to provide new sampler means for conveyor moved materials or the like

2 wherein a sample can be taken periodically as a result of actuating a control means.

One other object of the invention is to provide a new sampling apparatus mountable on conventional conveyor structures having control means to selectively discharge a material sample, and the control means constructed of a non-conductive material whereby the apparatus is incapable of causing an explosion.

A still further object of the invention is to provide new sampling apparatus for sampling conveyor moved materials or the like wherein control means actuates movement of a sample receiving portion of the apparatus to discharge the material into a sample receiving portion of the apparatus and wherein means are provided to automatically return the material receiving portion to a position to receive another material sample during a subsequent cycle of operation of the apparatus.

Another object of the invention is to provide new and novel means for controlling movement of a sample cup or the like in a grain sampling apparatus and the means is constructed of a non-conductive material so as to be spark and explosion proof.

Various other objects, advantages and features of the invention will become apparent to those skilled in the art from the following description taken in conjunction with the accompanying drawings, in which:

FIG. 1 is a foreshortened cross sectional view of a conventional vertical conveyor structure with the apparatus of this invention for sampling conveyor moved materials positioned thereon;

FIG. 2 is an enlarged fragmentary elevation view of the sampling apparatus of this invention illustrated as secured to the belt member of a conventional conveyor structure;

FIG. 3 is a cross sectional view taken along the line 3—3 in FIG. 2 illustrating the actuated position of the sample cup of this invention in dotted lines;

Figure 4:
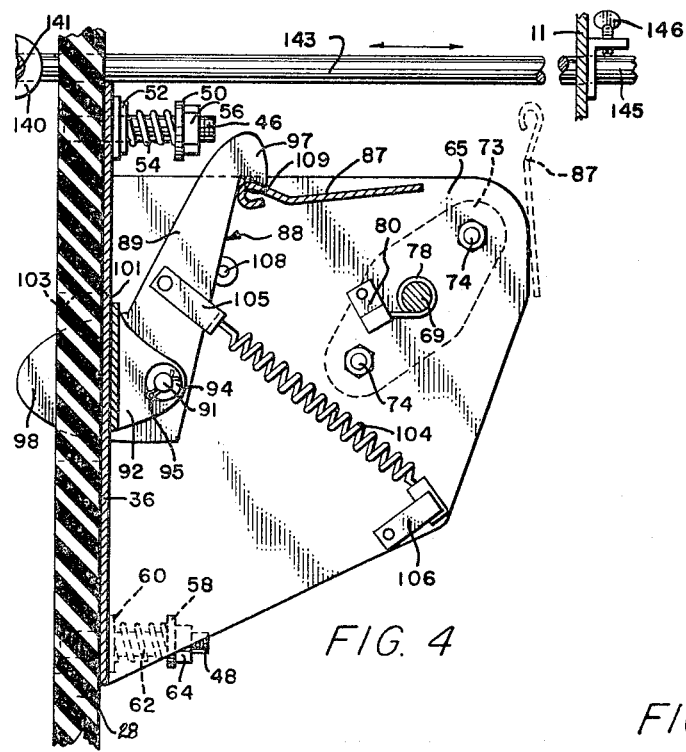
FIG. 4 is a cross sectional view taken along the line 4—4 in FIG. 2 similar to FIG. 3.
Figure 5:
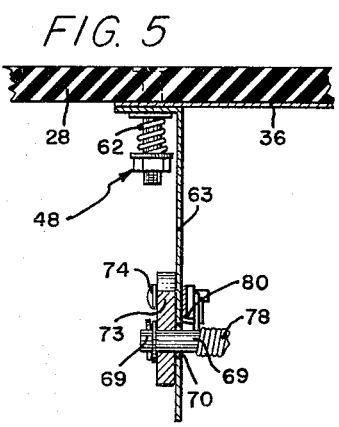
FIG. 5 is a fragmentary cross sectional view taken along the line 5—5 in FIG. 2.

The following is a discussion and description of preferred specific embodiments of the new sampling apparatus of this invention, such being made with reference to the drawings wherein the same reference numerals are used to indicate the same or similar parts and/or structure. It is to be understood that such discussion and description is not to unduly limit the scope of the invention.

Referring now to the drawings in detail and to FIG. 1 in particular, a conveyor system is shown generally at 10 and includes a conveyor housing 11 having an outlet 12 at an upper portion thereof and an inlet 14 at a lower portion thereof to receive grain, material in granular form, or other suitable materials to be moved vertically by a conveyor apparatus 15. The conveyor apparatus 15 includes a head roller 16 rotatably mounted on the upper portion of the housing 10, a boot roller 18 rotatably positioned in the lower portion of the housing 11 and an inner housing 20 positioned intermediate the head roller 16 and boot roller 18 and between the outer walls of the housing 11. This conveyor system 10 can be of any height and is normally used to convey materials between floors in a material processing plant such as flour, mill or grain elevator.

Preferably, a sample chute 22 is provided and is connected to a side 24 of the conveyor housing 11 with an upper portion of the sample chute 22 opening into the housing 11. The lower portion 26 of the sample chute 22 is preferably generally funnel-shaped and has an opening in the bottom thereof to discharge a sample of conveyed material therefrom.

An endless belt, chain or the like 28 extends between and is mounted about the head roller 16 and the boot roller 18 and is movable therearound in an oscillatory path during operation. A plurality of buckets or cup members 30 of any suitable trough shaped construction are provided and are mounted on the belt 28 to be movable therewith. The buckets 30 normally have a side portion thereof which is secured to the belt 28 and a bottom portion projecting outwardly substantially perpendicular to the belt 28. The buckets 30 are moved during oscillatory movement of the belt 28 about the lower or boot portion of the housing 11 upwardly around the head roller 16 and returned to the boot portion of the housing 11 to thereby receive and convey grain or other suitable materials fed into the boot portion of the housing 10. Mounted in place of one of the buckets 30 is the sampling means of this invention and such has been designated generally at 32 in FIG. 1 to show the relationship between the sampling means of this invention and the conventional conveyor structure.

Referring now to FIGS. 2 and 3 of the drawings in detail, a preferred specific embodiment of the sample means 32 includes a sampling apparatus 33 mounted on the endless belt 28 and an actuator lever 35 connected to the housing 11 and operably associated with the sampling apparatus 33 as will be later explained.

The sampling apparatus 33 includes a substantially rectangular support plate 36 which is operatively connectable to the belt 28 in any suitable manner. As illustrated in the drawings, upper and lower pairs of mounting bolts 46 and 48 are provided which have the head end portions thereof positioned against the inner surface of the belt 28 with the shank portions thereof projecting through the belt 28 and through upper and lower portions, respectively, of the support plate 36. Washers 50 and 52 are mounted about the shank portions of the bolts 46 and coil or helical springs 54 are positioned between the washers 50 and 52 and surround the shank portion of the bolts 46; and by tightening these nuts 56, the tension of springs 54 can be adjusted. In the same or similar manner, washers 58 and 60 are positioned on the bolts 48 and are engaged by helical springs 62 with the spring tension being adjusted by movement of nuts 64 on the bolts 48. This preferred mounting of the support plate 36 on the belt 28 provides a flexible or resilient mounting for the sampling apparatus 33 which is desirable for oscillatory movement about the rollers 16 and 18.

Projecting outwardly from and welded to the exposed surface of the support plate 36 is a pair of spaced parallel support brackets 63 and 65 of L-shape in transverse cross section. The brackets 63 and 65 are positioned adjacent the outer edges of the support plate 36 and adapted to support a sample cup assembly 66 of the sampling apparatus 33 therebetween.

The sample cup assembly 66 includes a scoop shaped cup member 68 secured to an elongated shaft 69 having opposite ends extended through holes 70 in the brackets 63 and 65. The shaft 69 is constructed of a square bar material having a square mid-section 72 and opposite end portions machined to a cylindrical shape. The opposite ends of the shaft 69 are rotatably carried in plastic bearing supports 73 secured as by bolts 74 to the outer surfaces of the brackets 63 and 65, respectively. Outwardly of each bearing support 73 is a washer 76 mounted about the shaft 69 and cotter pin 77 extended in a hole therein to secure the shaft 69 against axial movement while permitting rotation thereof. Between the mid-section 72 and each of the brackets 63 and 65 is a helical spring 78 mounted about the shaft 69, having one end secured to a tab member 80 welded to a respective one of the brackets 63 and 65 and the opposite end extended within a hole in the adjacent end of the mid-section 72. The helical springs 78 are wrapped about the shaft 69 so as to bias the same in a clockwise direction as viewed in FIG. 3 for reasons to become obvious.

As shown in FIGS. 2 and 3, the cup member 68 has triangular shaped sidewalls 82 and 83 and a bottom wall 84 integral with a back wall 85 thereby forming a material receiving cavity therebetween. The bottom wall 84 is secured by bolts 86 to the mid-section 72 whereby its square bar shape permits rigid attachment thereto. The sidewall 83 has a laterally extended latch section 87 adjacent the bracket 65 for reasons to be explained. It is seen, therefore, that the cup member 68 is mounted between the brackets 63 and 65 and movable from a loaded or cocked position extended substantially perpendicularly to the belt 28 to a discharge position rotated substantially 90 degrees therefrom as shown in dotted lines in FIG. 3.

In order to hold the sample cup assembly 66 in the cocked position, a latch mechanism 88 is engageable with the latch section 87 of the sidewall 83 (FIG. 4). The latch mechanism 88 includes a vertically extended lock member 89 pivotally mounted on a shaft 91 having one end secured to the bracket 65 and the opposite end carried in a bracket plate 92 welded to the support plate 36. The lock member 89 is made of a plastic or non-conductive material for reasons to be explained. A standrad washer 94 and cotter pin 95 secures the shaft 91 to the bracket plate 92 against axial movement and limits lateral movement of the lock member 89. The lock member 89 has a hook portion 97 engageable with the latch section 87 of the cup member 68 and a cam portion 98 which is movable transversely of openings 101 and 103 in the support plate 36 and the belt 28, respectively. The lock member 89 is pivotal about the shaft 91 from the first latched or cocked position as shown in FIG. 4 to a second release or discharge position indicated by dotted lines in FIG. 3. The lock member 89 is biased towards the latch position, clockwise as viewed in FIG. 4, by a tension spring 104 having one end secured to a clamp 105 mounted on the hook portion 97 and the other end secured to a spring tab 106 welded or bolted to the bracket 65. This clockwise movement through the latched position is limited by a stop pin 108 secured to the bracket 65 and extended into the path of movement of the lock member 89 and engageable with the hook portion 97. It is seen, therefore, that the hook portion 97 has a lock surface 109 engageable with the latch section 87 of the cup member 68 to hold the same in the loaded or cocked position whereby pivotal movement of the hook portion 97 out of engagement with the cup member 68 results in the clockwise rotation, as viewed in FIG. 3, of the cup member 68 to the discharged position under the force of the helical springs 78.

In order to re-load or cock the sample cup assembly 66, a cam actuated cup guide assembly 111 is connected to the support plate 36 and operably associated with the cup member 68 (FIG. 3). The guide assembly 111 includes an irregular shaped vertically extended transfer plate 113 mounted within rectangular openings 115 and 116 in the support plate 36 and the belt 28, respectively, and having an upper connector portion 118 pivotally mounted on a pin 119. Opposite ends of the pin 119 are carried in angle brackets 121 welded to the support plate 36 adjacent opposite edges of the openings 115. The transfer plate 113 is made of a plastic or a non-metallic material for reasons to become obvious. The transfer plate 113 has a cam portion 123 movable transversely of the openings 115 and 116 and a curved outer end portion 125 engageable with the lower surface of the cup member 68 outwardly of the shaft 69. The end portion 125 is maintained in constant contact with the under surface of the cup member 68 by a pair of springs 126 extended between and secured to guide brackets 128, welded to the cup member 68 and a U-shape clamp 129 secured as by a bolt to the transfer plate 113. As shown in FIG. 2, the guide brackets 128 are of U-shape in transverse cross section with the inner adjacent legs 131 holding the transfer plate 113 in vertical alignment and the springs 126 are secured to the other legs 133, respectively. The pivotal movement of the transfer plate 113 is further restricted between the openings 115 and 116 by a pair of guide plates 135 each secured to the support plate 36 on opposite sides of the transfer plate 113. The guide plates 135 have outwardly extended legs 137 adjacent opposite sides of the transfer plate 113 to restrict lateral movement thereof.

As shown in FIG. 3, the transfer plate 113 is pivotal about the pin 119 to transfer its movement to pivotal movement of the cup member 68 about the shaft 69. When the sampling cup assembly 66 is in the discharged position as shown in dotted lines in FIG. 3, the transfer plate 113 is pivoted clockwise with movement in this direction restricted by engagement of a stop ledge 138 with the support plate 36. It is seen that subsequent counterclockwise rotation of the transfer plate 113, as viewed in FIG. 3, results in rotation of the cup member 68 to a position whereby the latch mechanism 88 can hold the same in the latched or material receiving position.

Figure 7:
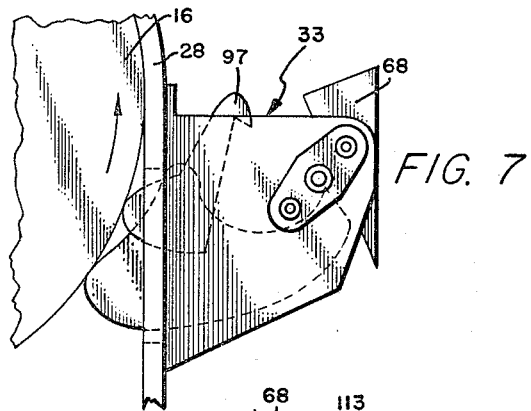
FIGS. 7, 8 and 9 are schematic diagrams illustrating the sampling apparatus of this invention in various stages of actuation in passing over the head roller of a conventional conveyor structure.
Figure 6:
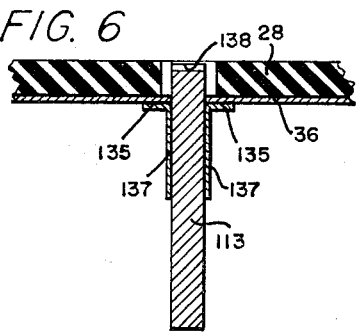
FIG. 6 is a fragmentary cross sectional view taken along the line 6—6 in FIG. 2.
Figure 8:
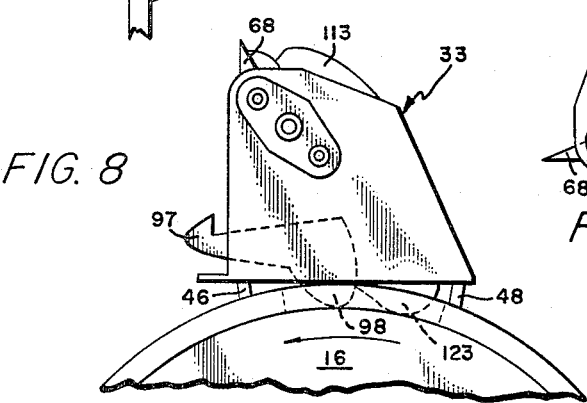
Figure 9:
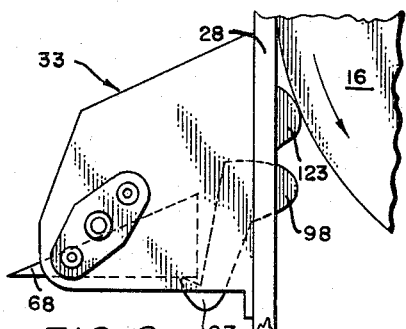

In the use and operation of the sampling apparatus 33 of this invention, it is understood that the cam portions 98 and 123 of the lock member 89 and the transfer plate 113, respectively, extend inwardly and transversely of the belt 28 and are therefore engageable by the head roller 16 and the boot roller 18 on each oscillatory movement thereabout. The actuation of parts is identical on movement of the sampling apparatus 33 about both rollers and therefore movement about the head roller 16 as shown in FIGS. 7–9 need only be described in detail. The operation is illustrated with the sample cup assembly 66 in the actuated or discharged position as shown in dotted lines in FIG. 3 and similarly in FIG. 7 as approaching the head roller 16.

The cam portion 98 of the lock member 89 first contacts the head roller 16 to pivot the hook portion 97 to the unlatched position. Immediately thereafter, the cam portion 123 of the transfer plate 113 contacts the head roller 16 and is pivoted counterclockwise, as viewed in FIG. 8, to move and hold the contacting sample cup assembly 66 in the latched or cocked position. However, since the hook portion 97 is in the unlatched position, the sample cup assembly 66 is merely held in this latched position by the transfer plate 113 against the bias of the helical springs 78 over substantially the entire movement about the head roller 16.

On the downward movement as shown in FIG. 9, the cam portion 98 of the lock member 89 is the first to move out of contact with the head roller 16 whereupon the hook portion 97 is moved under the tension of the spring 104 into locking engagement with the cup member 68. Thereafter, the cam portion 123 of the transfer plate 113 moves out of engagement with the belt 28 but the sample cup assembly 66 is held in the latched or cock position by the now engaged lock member 89.

It is apparent that the sample cup assembly 66 will proceed through substantially the same above mentioned steps on each pass around the head roller 16 and the boot roller 18. However, due to the speed of the belt 28 and the rapid successive contact of the cam portions 98 and 123 with the belt 28, the sample cup assembly 66 experiences little movement on passing over the rollers except when moved from the fully discharged position to the latched position on engaging the head roller 16 which has been described in detail.

In order to provide for the actuation of the sample cup assembly 66 to discharge conveyed material into the sample chute 22, the actuator lever 35 secured to the housing 11 is moved axially so as to be engageable with the cam portion 98 of the lock member 89. The actuator lever 35 consists of an elongated L-shape rod having a roller 140 rotatably mounted about one leg 141. The roller 140 is made of a plastic or non-conductive material. The opposite leg 143 of the actuator lever 35 extends through a hole in the housing 11 and is slidably supported within a lever mount 145 welded to the housing 11. A lock screw 146 is threaded into the lever mount 145 and is selectively movable into locking engagement with the leg 143 to hold the actuator lever 35 in a given position. It is seen that the actuator lever 35 is axially movable from an inactive position to a sample taking position shown on dotted lines in FIG. 3.

When the actuator rod 35 is in the sample taking position, the cam portion 98 is engaged by the roller 140 whereupon the hook portion 97 is moved out of locking engagement of the cup member 68 and the helical springs 78 rapidly rotate the sample cup assembly 66 to propel sample material contained therein into the sample chute 22. As previously explained, the discharge sample cup assembly 66 will be re-latched on passing over the head roller 16 and will pick up and elevate another supply of material on passing around the boot roller 18. It is obvious that the actuator lever 35 can be actuated to take a material sample on each oscillation of the belt 28 or as desired.

As previously described, the contacting parts of the sampling means 32 of this invention are constructed of rubber, plastic or any non-conductive material whereby no electric sparks can be generated within the conveyor structure. This is extremely desirable in the use of the sampling means 32 when elevating coal, flour, and the like wherein an explosive dust atmosphere is created. Also, it is obvious that a plurality of different types of sampling cup assembly actuator means can be provided such as photoelectric cells, a solenoid operated actuator lever, and the like.

The sampling means of this invention can be used for sampling flour and other suitable materials which are moved by conveyor means. Material which can be sampled include further grain products, cement, sand gravel, other like materials used in the construction industry, and coal or other mine products, and other products which can be received in a sample cup or similar structure mountable on a conveyor belt or the like.

While the invention has been described in connection with preferred specific embodiment thereof, it will be understood by those skilled in the art that such is intended to illustrate, not to limit, the scope of the invention which is defined by the following claims.

I claim:

1. Means for conveying and sampling grain material or the like comprising:
   (a) an endless conveyor means,
   (b) support means mounted on said conveyor means to move therewith,
   (c) a sample cup member movably mounted on said support means,
   (d) actuator means operatively connected to said cup member and to said support means and movable relative thereto to cause movement of said cup member from a material conveying position for discharge of grain or the like therein,
   (e) latch means operatively connected to said actuator means to prevent movement thereof,
   (f) release means operatively connected to said latch means operable to release said latch means and permit movement of said cup member and said actuator means to a discharged position, and
   (g) means for moving said cup member to said material conveying position from the discharged position operably connected to said support means and said cup member.

2. A sampling means as described in claim 1, wherein:
(a) said support means having a shaft member rotatable about its axis,
(b) said cup member secured to said shaft member whereby said shaft member is rotatable to move said cup member from the material conveying position to the discharged position and vice versa, and
(c) said actuator means having spring members mounted on said shaft member to bias said cup member toward the discharged position.

3. A sampling means as described in claim 2, wherein:
(a) said moving means having a transfer plate pivotally connected to said support means, and
(b) said transfer plate engageable with said conveyor means to move said cup member to the material conveying position.

4. A sampling means as described in claim 1, wherein:
(a) said latch means having a hook member pivotally connected to said support means,
(b) said hook member having one end movable into locking engagement with said cup member and the opposite end formed into a cam portion, and
(c) said release means having an actuator lever connected to said conveyor means and selectively movable into engagement with said cam portion whereby said hook member pivots out of locking engagement with said cup member to permit movement of said cup member to the discharged position.

5. A sampling means as described in claim 4, wherein:
(a) said hook member made of a non-conductive material whereby contact of said cam portion and said actuator lever is spark free.

6. A sampling means as described in claim 1, wherein:
(a) said conveyor means having a head roller, a boot roller, an endless belt member movable about said head roller and said boot roller, and a plurality of spaced container members secured to said belt member whereby said container members operate to pick up and carry the grain from said boot roller to said head roller,
(b) said support means having bracket members and a shaft member extended between and rotatably mounted on said bracket members,
(c) said cup member secured to said shaft member and rotatable therewith from the material conveying position to the discharged position and vice versa, and
(d) said latch means having a hook member pivotally connected to one of said bracket members engageable with said cup member to hold the same in the material conveying position.

7. A sampling means as described in claim 6, wherein:
(a) said actuator means having spring members mounted about said shaft member, said spring members having opposite ends secured to said bracket members and said shaft member to bias said cup member to the discharged position, and
(b) said release means having an actuator lever selectively movable into engagement with said hook member for pivotal movement out of engagement with said cup member whereby said cup member is moved to the discharged position by said spring members.

8. A sampling means as described in claim 7, wherein:
(a) said moving means having a transfer plate pivotally connected to said support means, and
(b) said transfer plate having one portion in contact with said cup member and a cam portion engageable with said head roller to move said cup member to the material conveying position whereby said actuator means is engageable with said hook member to cause rotation of said cup member to the discharged position and said transfer plate is engageable with said head roller to return said cup member to the material conveying position.

9. A sampling means as described in claim 8, wherein:
(a) said hook member, said transfer plate, and the contacting portion of said actuator lever constructed of a non-conductive material whereby the operation of said sampling means is spark free so as to be explosion proof.

References Cited by the Examiner
UNITED STATES PATENTS
2,359,641  10/1944  Harlow _____ 73—421
2,404,373  6/1946  Harlow _____ 73—421

LOUIS R. PRINCE, *Primary Examiner.*